Patented Sept. 19, 1944

2,358,429

UNITED STATES PATENT OFFICE 2,358,429

PREPARATION OF PECTASE

John J. Willaman, Plymouth Meeting, and Claude H. Hills, Philadelphia, Pa., assignors to Claude R. Wickard, as Secretary of Agriculture of the United States of America, and his successors in office No Drawing. Application September 14, 1942, Serial No. 458,335

5 Claims. (Cl. 195—67)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of the enzyme pectase and has for its objects the obtainment of a highly active enzyme in water soluble form, free from extraneous matter such as cellulose and pulpy materials; also, the preparation of plant material containing pectase in a dry form which will remain stable for a long period, and the production of pectase in a simple manner from readily obtainable sources of materials.

The pectase material of this invention is especially suitable for use in preparing pectinic acids in accordance with the disclosure of copending application Serial No. 458,336, filed September 14, 1942, by John J. Willaman, Hugh H. Mottern, Claude H. Hills, and George L. Baker.

Since there is some confusion in nomenclature, the following definitions are given: By "pectin" is meant the familiar perparation of commerce or of the laboratory, prepared from plant extracts by precipitation with alcohol, acetone, or metallic salts, with no attempt to modify its natural methoxy content. The latter varies from about 10 to 14 percent. By "pectic acid" is meant a more or less completely demethoxylated pectin, usually attained by treating pectin with alkali. By "pectinic acid" is meant any one of a series of derivatives of pectin with methoxy content intermediate between that of pectin and pectic acid. In the present application, the term "pectinic acid" is used generically to indicate either the acid itself or its salts. By "pectase" is meant the enzyme which hydrolyzes the methyl ester, or methoxy, groups in pectin, liberating an acid group for each methoxy group involved.

For most purposes for which enzymes are employed, it is very desirable that the enzyme preparation be highly active and soluble in aqueous media. It should also be as free from extraneous matter as possible, so that a minimum of the latter will contaminate the product on which the enzyme acts. Also, since enzymes in general are far more stable when dry than when in solution, it is desirable that commercial enzyme preparations be produced in a dry form. The present invention discloses methods for achieving both objects in the case of pectase: on the one hand, the production of a water solution of the enzyme free from cellular debris, and on the other hand, the production of a dry, stable material containing the enzyme.

The enzyme pectase occurs in many rather diverse plant materials, such as lilac leaves, alfalfa, molds, malt, tobacco stems and leaves, and the fruits of cherry, of tomato, and of eggplant. Since the main commercial use for pectase is in the production of highly polymerized pectinic acids, according to copending application mentioned above, and since in this use the presence of pectinase, another pectic enzyme which frequently accompanies pectase, is highly undesirable, the preferred sources of pectase are those which are very active in pectase and in which there is little or no pectinase. So far as our present knowledge goes, the fruits of tomato and of eggplant meet these conditions most satisfactorily, and they will be used as illustrations in the following disclosure.

It has been discovered in this invention that pectase is largely adsorbed on the pulp and cellulose material at a relatively low pH, say 3 to 4, but is largely desorbed at a higher pH, say 5 to 7. For example, ordinary tomato juice, prepared by grinding ripe tomatoes through a screen which retains the seeds, skin, and core but allows the rest of the pulp to pass, has high pectase activity. If this juice, at its natural pH of about 4, is separated into clear serum and residual pulp, only a small portion of pectase is found in the serum, the bulk of the activity being in the pulp. If, however, the pH of the whole tomato juice is changed from its natural level to about 6, it is found that most of the pectase activity is now in the serum, with only a little in the pulp, and this can be washed off readily. The same phenomena occur relative to the juice of eggplant fruit.

It can readily be seen that this discovery can be very advantageously used in the preparation of pectase for commercial use from readily obtainable materials. It is especially advantageously used in making pectinic acids as described in the above-mentioned copending application.

When used in the making of pectinic acids, whole juice may be added to the pectin mixture, and since the latter is kept at pH about 6, the pectase is desorbed into the solution and proceeds to function at full activity. In this procedure, however, the pulp of the tomato juice must be removed from the mixture before preparing the final pectinic acid, since it constitutes an undesirable contaminant. If the pulp of the whole natural tomato juice be separated from the clear serum before adding the serum to the pectin mixture, most of the pectase is lost in the pulp and the serum cannot be economically used.

If, however, natural whole juice is brought to a pH of about 6 and the clear serum is then separated therefrom, most of the pectase activity will be present in the serum. Such serum is a valuable product and it can be added to the pectin mixture without adding the undesirable pulp.

The same principle holds in obtaining a clear solution of highly active pectase from other plant materials, for example, the fruit of eggplant. Table I shows the general relation between the pH and release of pectase from pulp. The optimal pH for desorption of pectase from the pulp is not always exactly the same, but the preferred range is from 5 to 6.5. In practice, a pH of about 6 is usually satisfactory. If the absolute maximum desorption is desired, trial determinations for the optimal pH for each specific source material should be made.

TABLE I

*Effect of pH on release of pectase from pulp of tomato and of eggplant*

| pH before filtering | Percent methoxy removed from 1.0 gm. pectin in 30 minutes | | |
|---|---|---|---|
| | Tomato I | Tomato II | Eggplant |
| 3.8 | 0.06 | | |
| 4.1 | | 0.19 | |
| 4.8 | | | 0.3 |
| 5.0 | 2.70 | 1.52 | |
| 6.0 | 2.60 | 2.48 | 1.1 |
| 7.1 | 0.24 | | |

The discovery can be also used to advantage in making a dry pectase preparation. According to one known method for the removal of water from plant material with conservation of the enzymes, the divided material is dried in a current of air at a temperature below 35 to 40° C. According to another method, the water is removed by submerging the plant material in strong alcohol or acetone several times and then freeing the material from the residual solvent by low temperature drying. According to a third method, the enzyme, if in a clear serum of the material, is precipitated by alcohol or acetone and the precipitate is removed and dried at a low temperature.

In the case of pulpy tomato juice, none of these methods is satisfactory or economical. If the whole juice is dried, the contained sugars cause the final material to be sticky, gummy, and hygroscopic; if the whole juice is precipitated with alcohol or acetone, large volumes of the solvents are required; if the clear serum at the natural pH is precipitated, only low pectase activity will be found in the final dry product.

If, however, cognizance is taken of the discovery of this invention, pulpy fruits such as tomato juice, can be utilized to obtain pectase in a dry precipitation. The preferred method is to wrap the whole juice in suitable cloths, press out the clear serum, discard it since it contains little pectase, and then dehydrate the small volume of residual pulp with several treatments of 95 to 100 percent alcohol or 100 percent acetone. The final dried pulp is brittle, non-hygroscopic, easily ground, will maintain its pectase activity for a long time, contains most of the original activity of the whole juice, and is less than 1 percent of the original juice in weight. In some cases it may be desirable to adjust the pH of the whole juice before pressing to a value lower than its natural pH, in order to keep the pectase activity of the serum at a minimum.

When a clear solution of pectase is desired, it may be obtained by suspending the dried pulp for a few minutes in a suitable volume of water, adjusting the pH to about 6, and then removing the pulp from the clear water extract. The pectase is desorbed into the clear extract by this treatment.

The adjustment of pH may be made by sodium hydroxide solution, but since the presence of salts in appreciable amount assists the desorption, it is preferable to use an alkaline phosphate solution.

In making dry pectase preparations from other plant materials, the above process may also be followed. If the fruit has little serum, as is the case with eggplant fruit, the sliced or chopped tissue thereof may be readily dried directly by a current of air to a brittle, easily ground preparation. A clear solution of the pectase is obtained from this dried material in the same manner as explained relative to the dried tomato pulp.

Similar ways of taking advantage of the discovery relative to the relationship of the adsorption of pectase to the pH of the medium surrounding its tissue of origin will be obvious to those skilled in the science of chemistry.

A few specific illustrations of the invention are given below:

*Example 1*

1470 grams of half-ripe tomato fruits were passed through a sieve-type juicing machine, yielding 1250 grams of pulpy juice and 220 grams of residual skins and seeds. The 1250 grams of juice, with no adjustment of pH, were wrapped in cheesecloth and then in canvas and pressed in a hydraulic press. 1192 grams of clear pressed juice were obtained and discarded. The 58 grams of remaining pulp were dehydrated by stirring with 180 cc. acetone, filtering, repeating this process twice, and then drying by spreading the pulp on a table at room temperature over night. The dried product was easily ground to a powder. It weighed 8.5 grams and had 86 pectase units per gram, whereas the original juice had only about 2 pectase units per gram. (Units of pectase activity being measured according to the method of Kertesz (Journal of Biological Chemistry 121:589 (1937)).)

*Example 2*

Unripe fruit of eggplant was cut into $\tfrac{1}{16}$-inch thick slices and dried in a current of air, under 40° C., until it was practically dry. The brittle slices were easily ground to a fine powder.

(a) 2 grams of this powder were suspended in 80 cc. water, with the pH of the mixture adjusted to 4.75. The mixture was squeezed through cheesecloth to give a clear extract. Its pectase activity was 7.3 units per gram of original powder.

(b) 2 grams of the powder were suspended in 80 cc. water, with the pH of the mixture adjusted to 6.0 with 4.9 cc. 0.2 normal sodium hydroxide. The mixture was squeezed through cheesecloth to give a clear extract. In this case its pectase activity was 27 units per gram of the original powder.

A clear solution of pectase, prepared by any of the above means, may be kept for considerable time if the pH is about 5 to 6, if toluene is present, and if it is stored in a refrigerator. The presence of up to 2 percent phosphate is also beneficial.

Having thus described our invention, we claim:

1. A method for obtaining pectase in an aqueous solution comprising suspending ground plant tissue containing pectase in an aqueous medium having a pH of from 5 to 7, whereby the pectase is desorbed from the plant tissue and dissolved in the aqueous medium, and removing the insoluble materials from the suspension.

2. A method of obtaining a purified form of pectase in an aqueous solution comprising adjusting the pH of a pulpy plant juice containing pectase to from 3 to 4, whereby the pectase is largely adsorbed in the pulp, removing the insoluble pulpy material, suspending the latter in an aqueous medium having a pH of from 5 to 7, whereby the pectase is desorbed from the pulpy material and is dissolved in the aqueous medium, and then removing the pulpy material from the suspension.

3. A method of obtaining a solution of pectase in the serum of a natural pulpy plant juice containing pectase adsorbed in the pulp, comprising adjusting the pH of the natural plant juice to from 5 to 7, whereby the pectase is desorbed from the pulp and is dissolved in the serum, and removing the pulp from the serum solution.

4. A method of making a dry preparation of pectase from a pulpy plant juice containing pectase, comprising removing the pulp from the rest of the juice at a pH lower than 5, whereby the pectase is largely adsorbed in the pulp, and then drying the pulp.

5. A method of obtaining a purified form of pectase in an aqueous solution, comprising removing the insoluble pulpy material from a pulpy plant juice containing pectase at a pH lower than 5, whereby the pectase is largely adsorbed in the pulp, suspending the removed pulpy material in an aqueous medium having a pH of from 5 to 7, whereby the pectase is desorbed from the pulpy material and is dissolved in the aqueous medium, and then removing the pulpy material from the suspension.

JOHN J. WILLAMAN.
CLAUDE H. HILLS.